United States Patent Office 3,477,970
Patented Nov. 11, 1969

3,477,970
PIGMENTED PAPER COATING AND ADHESIVE COMPOSITIONS CONTAINING A POLYVINYL ALCOHOL BINDER AND A MODIFIER THEREFOR
Robert H. Beeman, Kennett Square, Pa., assignor to E. I. du Pont de Nemours and Company, Wilmington, Del., a corporation of Delaware
No Drawing. Filed Sept. 4, 1962, Ser. No. 221,315
Int. Cl. C09j 3/14
U.S. Cl. 260—17
14 Claims

ABSTRACT OF THE DISCLOSURE

Compositions that are suitable for paper coatings and adhesives comprising a pigment and a pigment binder consisting of a water-soluble polyvinyl alcohol-water-soluble modifier combination are disclosed.

---

This invention relates to compositions that are suitable for use as papercoatings and adhesives.

Pigmented papercoating compositions (commonly referred to in the art as "coating colors") are applied to paper and paperboard for several reasons: to provide a smooth and ink receptive surface for printing, to obtain decorative effects, to reduce the roughness and non-uniformity of the paper surface, etc. Clays are most widely used commercially as the pigment but substantial amounts of other pigments such as calcium carbonate and titanium dioxide are also used. The pigment binders most commonly used heretofore include starch, casein or alpha protein, styrene-butadiene polymer, acrylic resins and polyvinyl acetate.

The optical properties of coated paper depend to a large extent on the amount (but not the type) of binder. As the amount of binder is reduced, the optical properties such as opacity, brightness and gloss are improved. In general, it is desirable to apply the coatings with the minimum binder content. However, as the amount of binder is reduced, the strength of the coating and the bond between the coating and the substrate are also reduced. There is a minimum binder content below which the coating is not strong enough to be useable. The binders commonly used heretofore are normally employed in amounts of 12 to 20 parts binder per 100 parts of pigment.

Polyvinyl alcohol is a very powerful pigment binder. This means that a relatively small amount of polyvinyl alcohol is required to obtain a coating that has adequate strength to be commercially useable. Since the amount of polyvinyl alcohol required is small, coatings can be prepared which have excellent optical properties. Coatings containing 3-4 parts by weight of polyvinyl alcohol per 100 parts of pigment are equivalent in strength and are considerably superior in optical properties than coatings containing 18 parts of starch. Furthermore, since less polyvinyl alcohol is needed than is required of other types of common binders, it is possible to make a much lighter weight coated paper with polyvinyl alcohol than with starch (for example).

In spite of the fact that polyvinyl alcohol is a superior pigment binder in some respects, polyvinyl alcohol has heretofore been entirely unsatisfactory as a papercoating pigment binder because of certain deleterious characteristics. Many attempts have been made to apply aqueous polyvinyl alcohol-pigment coating colors to paper or paperboard with various types of coating equipment including the roll coater such as described in U.S. Patent 1,921,369, the trailing blade coater such as described in U.S. Patent 2,368,176 and the offset gravure coater, the size press and the trailing blade coater which are described by G. L. Booth in Tappi, vol. 39, December 1956, pp. 846-850, and other coaters used in the art. These attempts have been unsuccessful because of the production of a severe pattern in the coating as it transfers from the coater to the paper. This results in a coating which is rough or streaked. These defects are not smoothed appreciably by supercalendering. The severe pattern makes it impossible to obtain a satisfactory printing job over these polyvinyl alcohol-pigment coatings. Furthermore, the coatings are not attractive if used simply as decorative coatings. Thus it will be readily recognized that the development of a commercially acceptable polyvinyl alcohol-pigment coating color would represent a significant construction to the paper coating art.

While polyvinyl alcohol-pigment compositions have not heretofore provided commercially acceptable papercoatings. various formulations based on polyvinyl alcohol and clay have been successfully used to some extent as adhesives. U.S. Patent 2,487,448 discloses adhesive compositions consisting of 50-70% kaolinitic nonalkaline clay and as a binder therefore, 15-25% by weight of polyvinyl alcohol, and 15-25% of unswollen starch. Such compositions are representative of what has been used widely in the industry to manufacture laminated paper and paperboard having excellent dry bond strength which do not lose dry bond strength after soaking in water. Because of the high viscosity of these compositions when dissolved in water, these adhesives are generally applied from an aqueous solution at a solids content in the range of 20-25% by weight.

For many applications such an adhesive composition is completely adequate. However, in some laminating operations, the high water content in a 20-25% solids content adhesive composition causes the laminate to curl and warp during the drying process. In order to minimize curling and warping, it is necessary to use a relatively high solids content adhesive, i.e., about 35-50% solids content. The high viscosity of a polyvinyl alcohol-starch-clay adhesive in water prohibits increasing the solids content thereof to the required 35-50% level.

The viscosity of adhesive compositions at a given solids concentration is due principally to the type and amount of binder (e.g. polyvinyl alcohol and starch). By increasing the ratio of clay to binder it is possible to increase the solids while maintaining an operable viscosity. If the binder content is reduced, however, it is necessary to use a strong binder in order to maintain laminate strength. Because polyvinyl alcohol is known to be a strong binder, it would seem logical to prepare an adhesive composition wherein polyvinyl alcohol is the sole binder used. However, while a composition consisting of 100 parts by weight of clay and 8 parts by weight of polyvinyl alcohol in a 40-45% solids content aqueous solution (for example) has an operable viscosity, such a formulation lacks tack and will not form a bond. Obviously then, there has heretofore existed a need for a relatively high-solids content polyvinyl alcohol adhesive composition capable of forming a strong laminate bond but which will not cause curling and warping of a laminate structure.

An object of this invention is to provide improved papercoating and adhesive compositions. A further object is to provide an improved papercoating composition which can be applied to paper and paperboard to produce a smooth, pattern-free coating. A still further object is to provide a paper substrate having an improved papercoating composition coated thereon. Another object is to provide an improved adhesive composition which can be applied from a relatively high solids content aqueous solution. Still another object is to provide a laminated article comprising at least two paper substrates adhered together by an improved adhesive composition. Other objects will be apparent from the following description of this invention.

These objects are obtained by the composition comprising 100 parts by weight of pigment 1–15 parts by weight of water-soluble polyvinyl alcohol and 0.1–4 parts by weight of a water-soluble modified selected from the group consisting of sodium carboxymethylcellulose, hydroxyethylcellulose, methylcellulose, sodium polyacrylate, and sodium alginate. As used hereinafter, for brevity the term "modifier" refers to the aforementioned group consisting of sodium carboxymethylcellulose, hydroxyethylcellulose, methylcellulose, sodium polyacrylate and sodium alginate.

When the compositions of this invention are used as papercoatings they usually comprise 100 parts by weight of pigment, 1–12 parts by weight of water-soluble polyvinyl alcohol and 0.1–4 parts by weight of modifier. When the compositions of this invention are used primarily as adhesives they usually comprise 100 parts by weight of clay, 3–15 parts by weight of water-soluble polyvinyl alcohol and 0.1–4 parts by weight of modifier.

Excellent papercoatings may be prepared which contain 1–12 parts by weight of polyvinyl alcohol per 100 parts by pigment, although it is generally preferable to use 2–8 parts of polyvinyl alcohol per 100 parts of pigment. If less than 1 part of polyvinyl alcohol is used per 100 parts of pigment, there is insufficient binding of the pigment and pigment particles tend to break loose and dust off of a coated paper. Use of more than 12 parts of polyvinyl alcohol per 100 parts of clay adversely affects the desired optical properties of papercoatings obtained with the compositions of this invention.

The ratio of polyvinyl alcohol to modifier is not critical but the ratio of modifier to pigment is somewhat critical. At least about 0.1 part of modifier per 100 parts of pigment is required to produce the improved coatings. Use of less than about 0.1 part of modifier per 100 parts of pigment does not eliminate the resultant deleterious patterning when the coating composition is applied onto paper. The addition of modifier to these compositions increases the viscosity thereof. The maximum limit on the amount of modifier is determined primarily by the operable viscosity limits of the composition; that is, the maximum viscosity of a composition that can be applied by the particular coating equipment employed. For example, for application on the trailing blade, high viscosity coatings colors are often desirable. In this case, the modifier might be used in amounts of 1.0–1.5 parts per 100 parts of pigment. However, for application on the air knife, low viscosity coating colors are required. In this case 0.5 part or less of the modifier might be used. For most applications about 4 parts of modifier per 100 parts of pigment is the operable maximum limit. The preferred amount of modifier for the most satisfactory results is about 0.2–3 parts per 100 parts of pigment.

Any grade of polyvinyl alcohol which is soluble in water can be used. The various grades of commercially available polyvinyl alcohol are commonly classified according to degree of hydrolysis and viscosity. Polyvinyl alcohol is produced by alcoholysis of polyvinylacetate. The term "completely hydrolyzed polyvinyl alcohol" indicates that 99–100% of the acetate groups of the polyvinyl acetate have been replaced by hydroxyl groups. The term "partially hydrolyzed polyvinyl alcohol" indicates that about 50–99% of the acetate groups of the polyvinyl acetate have been replaced by hydroxyl groups. As is commonly designated in the art, and as is used herein, high viscosity grade polyvinyl alcohol indicates a viscosity of from about 30 to 65 centipoises or higher, medium viscosity refers to about 20 to 30 centipoises, and low viscosity refers to about 3 to 20 centipoises; the viscosity being determined by means of the Hoeppler falling ball method described in the Encyclopedia of Chemical Technology (Interscience Encyclopedia Inc., New York), vol. 14, p. 773, using a 4% water solution at 25° C.

The completely hydrolyzed, medium and high viscosity grades are preferred because they are the most effective binders. The partially hydrolyzed grades and the low viscosity, completely hydrolyzed grades may also be used. However, they are less effective binders than the preferred grades, and consequently larger amounts of these grades must be used than is required for the preferred grades.

Any grade of the modifier may be used which is soluble in water. Generally, it is most advantageous to use sodium carboxymethylcellulose. The various grades of sodium carboxymethylcellulose are commonly classified according to degree of substitution and viscosity. Degree of substitution refers to the number of sodium carboxymethyl groups per anhydroglucose units in the cellulose structure. For example, a degree of substitution of 0.75 indicates that there are 0.75 sodium carboxymethyl groups per anhydroglucose unit. Completely substituted sodium carboxymethylcellulose contains 3 sodium carboxymethyl groups per anhydroglucose unit. As is commonly designated in the rt, and as is used herein, high viscosity sodium carboxymethylcellulose indicates a viscosity range of about 1300 to 2200 centipoises in a 1% water solution, medium viscosity refers to about 100 to 600 centipoises in a 2% water solution, and low viscosity refers to less than about 100 centipoises in a 2% water solution; the viscosity being determined at 25° C. by means of a Brookfield viscosimeter.

The preferred grades of sodium carboxymethylcellulose are the medium and high viscosity grades having a degree of substitution of about 0.65–0.85. The low viscosity grades of sodium carboxymethylcellulose having the same degree of substitution may also be used but higher concentrations are required to eliminate patterning. Furthermore, other grades of sodium carboxymethylcellulose having different degrees of substitution may be used, provided the grade used is water soluble.

Standard pigments known in the art which are suitable for use in coating colors may be used. Kaolin clay is generally preferred because of its desirable pigment characteristics and because it is relatively inexpensive. Other pigments such as calcium carbonate and titanium dioxide may also be used. In preparation of a coating color based on titanium dioxide it is usually preferred to select a grade of this pigment which is readily water-dispersible.

Three basic types of coating colors are commonly used in the art. These are determined by the particular printing process to be used for printing on the coated paper such as letterpress, offset lithography and rotogravure. Requirements for coatings to be printed by letterpress and rotogravure are quite similar. A typical example of an improved coating color of this invention, suitable application onto paper for printing by letterpress or rotogravure is shown below. In this formulation and the other compositions shown hereinafter the term "PVA" is used as an abbreviation for polyvinyl alcohol, and "CMC" is used as an abbreviation for sodium carboxymethylcellulose. In these formulations, the indicated viscosity of the polyvinyl alcohol is centipoises (cp.) of a 4% water solution at 20° C. determined by the Hoeppler falling ball method. Viscosity of the sodium carboxymethylcellulose is given in units of centipoises as determined by a Brookfield viscosimeter using the spindle size and speed indicated.

| Components: | Parts by weight |
|---|---|
| Kaolin clay | 100.0 |
| PVA (viscosity of 55–65 cp., 99–100% hydrolysis, and pH of 6–8) | 2.6 |
| CMC (degree of substitution of 0.65–0.85, viscosity of 1300–2200 cp. in a 1% solution using a No. 3 spindle at 30 r.p.m.) | 0.9 |
| Tetrasodium pyrophosphate (a dispersing agent) | 0.35 |
| Water | 104.0 |

This coating color, formulated at about 50% solids content in water, is suitable for application by trailing blade or roll coater. The following formulation is an example of an improved coating color suitable for application by an air-knife or size press.

| Components: | Parts by weight |
|---|---|
| Kaolin clay | 100.0 |
| PVA (viscosity of 28–32 cp., 99–100% hydrolysis, and pH of 6–8) | 2.6 |
| CMC (degree of substitution of 0.65–0.85, viscosity of 300–600 cp. in a 2% solution using a No. 2 spindle at 30 r.p.m.) | 0.9 |
| Tetrasodium pyrophosphate | 0.35 |
| Water | 155.8 |

In the above composition, medium viscosity polyvinyl alcohol and sodium carboxymethylcellulose are used and this coating color is formulated at about 40% solids content in water to obtain the low viscosity required by the air-knife and size press coaters.

Coatings which are to be printed by the offset process require some degree of wet-rub resistance and must be stronger than those used for letterpress or rotogravure. The wet-rub resistance is obtained by addition of an insolubilizer for the polyvinyl alcohol and modifier. The strength of the coating is increased by slightly increasing the amount of polyvinyl alcohol binder used. The following formulation is an example of a coating color suitable for offset printing.

| Component: | Parts by weight |
|---|---|
| Kaolin clay | 100.0 |
| PVA (viscosity of 55–65 cp., 99–100% hyhydrolysis, and pH of 6–8) | 7.0 |
| CMC (degree of substitution of 0.65–0.85, viscosity of 1300–2200 cp. in a 1% solution using a No. 3 spindle at 30 r.p.m. | 0.9 |
| Sodium hexametaphosphate | 0.35 |
| Ammonium chloride (a catalyst to promote the reaction between the insolubilizer and the PVA and CMC) | 0.35 |
| Triazone resin (an insolubilizer) | 1.4 |
| Water | 120.0 |

This composition is formulated at about 50% solids content in water and is suitable for application by trailing blade or roll coater. An offset coating suitable for application by air-knife or size press may be prepared by using medium viscosity grades of polyvinyl alcohol and modifier in place of the grades of polyvinyl alcohol and modifier shown above.

Other additives may be used in the formulations to provide specific effects. For example, it is often desirable to add a plasticizer to reduce the tendency of the coating to dust on the supercalender of the papercoating apparatus. Materials commonly used for this purpose include calcium stearate, ammonium stearate, mixtures of soap and stearates. Wax emulsions, tinting pigments and dyes also are often used in these coating colors. Any of these and other materials conventionally used in papercoatings may be added to the polyvinyl alcohol coating color provided they do not precipitate or gel the polyvinyl alcohol or modifier and provided that they do not cause agglomeration of the pigment.

These coating colors may be prepared by dissolving the polyvinyl alcohol and modifier in water, either together or separately. A high solids pigment dispersion is separately prepared and then mixed with the PVA modifier solution. This technique produces a completely satisfactory coating color. However, it is preferred to make the colors by adding the dry polyvinyl alcohol and modifier directly to the pigment dispersion and then heating to dissolve the polyvinyl alcohol. This technique of cooking the polyvinyl alcohol in the presence of the pigment substantially increases the binding power of the polyvinyl alcohol. This, in effect, means that less polyvinyl alcohol binder is required per hundred parts of pigment. Specifically, it is preferred to prepare the coating color as follows:

(1) The pigment is added to water (which preferably contains a dissolved suitable dispersing agent) with agitation and the mixture is agitated until the pigment is completely dispersed.

(2) Dry polyvinyl alcohol and dry modifier are added to the pigment dispersion. Water is added, if necessary, to keep the mixture workable.

(3) The mixture is heated to 190° F.–212° F. and held at this temperature, with good agitation, until the polyvinyl alcohol is dissolved. This normally requires 30–45 minutes. Any method of applying heat may be used, but it is often convenient to inject live steam directly into the mix.

(4) Other materials conventionally used in papercoatings are added to the mixture, if desired. These materials may be added while the color is still hot or may be added after cooling, depending on the specific additive. If an insolubilizer is added to promote wet-rub resistance, it is essential that the coating color be cooled to below about 130° F. before adding the insolubilizer. If the insolubilizer is added when the color is too hot, it may react prematurely and thus reduce the stability of the composition or may adversely affect the binding power of the polyvinyl alcohol. Water may be added to bring the coating color to the required solids content.

Other methods for preparing the compositions of this invention will be apparent to those skilled in the art.

It is quite surprising that the addition of one of the aforementioned modifiers to polyvinyl alcohol-pigment papercoatings eliminates the patterning problem. All of the effective modifiers are often called "thickeners" since they increase the viscosity of aqueous solutions and dispersions. However, the benefits obtained by the discovered modifiers are not directly related to the thickening effect. Other materials, such as natural or oxidized starch, which also are thickeners, do not eliminate the patterning when used in low concentrations with pigment.

In addition, the benefits of the discovered modifiers are not apparent from the rheology of the coating compositions of this invention.

Two methods can be used to demonstrate the benefits of the modifiers. First, and most reliable, is to actually apply the coating colors onto paper using commercial coaters or pilot coaters which simulate application of the coating colors by the larger scale commercial coaters and thereafter evaluate the resulting coatings. Second, by a test procedure familiar to those skilled in the art, the IGT Printability Tester may be used to qualitatively evaluate these coatings. This apparatus consists of a rotatable sector to which a strip of the test paper or paperboard is fastened. A circular wheel or disk is arranged to rotate freely in contact with the test paper. The rotatable sector is driven by a spring or pendulum, and when released, rapidly accelerates. The coating color to be tested is applied to the entire circumference of the wheel by means of a small brush. The wheel is brought into contact with the sector which is then released and allowed to rotate. This applied the coating color to the test paper. Details of this apparatus and procedure are discussed by G. A. Hemstock and J. W. Swanson in Tappi, vol. 40, October 1957, pp. 794–801.

After the coating color has been applied to the test paper or paperboard by the IGT apparatus, the applied coating is examined for the presence of pattern. If a pattern-free coating is obtained, the coating color will produce a pattern-free coating on commercial equipment. If patterning is evident on the test strip, the coating color will produce patterning when applied by commercial equipment.

The following examples further illustrate the preferred papercoating colors of this invention. In all of the examples presented herein, the polyvinyl alcohols and modifiers used were commercially obtained products. The viscosities and other specifications of these materials indicated are those specified by the manufacturers. The viscosities of the polyvinyl alcohols are specified in centipoises (cp.) of a 4% water solution at 20° C. determined by the Hoeppler falling ball method. The viscosities of the modifiers are specified in centipoises determined by a Brookfield viscosimeter (unless otherwise stated) at 25° C. using the spindle size and speed of rotation indicated.

In Examples 1 through 4 shown in Table I, the coating colors were prepared according to the procedure outlined above using kaolin clay pigment, polyvinyl alcohol ("PVA") and a sodium carboxymethylcellulose modifier ("CMC"). These colors were applied to paper on the commercial papercoating equipment indicated. Coated paper samples were then examined for pattern in the coatings. In the examples shown in Table I and the other tables which follow, a coating with a pattern indicated as "slight" or "none" is considered as being commercially acceptable, while a "heavy" or "severe" pattern is considered to be unacceptable. Example 5 listed in Table I shows the results obtained with a coating color which does not contain a modifier.

The compositions of this invention not only produce outstanding papercoatings, but also are superior paper adhesives which may be formulated at a high solids content (i.e., above 35%) to thereby eliminate the laminate warping and curling problem mentioned hereinbefore.

When the compositions of this invention are used as adhesives, the composition should contain 3–15 parts by weight of polyvinyl alcohol per 100 parts by weight of clay. A composition containing less than 3 parts of polyvinyl alcohol per 100 parts clay does not form a strong enough bond between paper substrates for most purposes and therefore is not useful as a paper adhesive. Use of more than 15 parts of polyvinyl alcohol per 100 parts of clay gives a composition viscosity that is too high for formulation at the required high solids content. The most satisfactory of these adhesives contain 5–12 parts by weight of clay. Any grade of polyvinyl alcohol may be used provided that it is water-soluble.

Any of the modifiers mentioned hereinbefore as suitable for use in the coating colors of this invention may also be used in the adhesives. The ratio of polyvinyl alcohol to modifier is not critical but the ratio of modifier to clay is somewhat critical. At least about 0.1 part by

TABLE I

| Example No. | Amount of PVA [a] (Parts/100 Parts of Clay) | Amount of CMC (Parts/100 Parts of Clay) | Percent Solids | Coater Type | Coating Rate of Speed, ft./minute | Pattern |
|---|---|---|---|---|---|---|
| 1 | 2.7 | [b] 0.55 | 44 | Trailing blade | 2,200 | None. |
| 2 | 2.7 | [b] 0.55 | 54 | do | 2,900 | Do. |
| 3 | 2.9 | [b] 0.9 | 45 | do | 2,200 | Do. |
| 4 | 4.5 | [c] 1.5 | 35 | Size press | 800 | Slight to None. |
| 5 | 4.0 | None | 45 | do | 500 | Severe. |

[a] Specified viscosity of 28–32 cp., 99–100% hydrolysis, and pH of 6–8.
[b] Specified degree of substitution of 0.65–0.85 and a viscosity of 1,300–2,200 using a No. 3 spindle at 30 r.p.m.
[c] Specified degree of substitution of 0.65–0.85 and a viscosity of 25–50 cp. using a No. 1 spindle at 60 r.p.m.

In Examples 6 through 10 shown in Table II coating colors were prepared using kaolin clay pigment, polyvinyl alcohol ("PVA") and modifier as indicated. The coating color patterning was determined by means of the IGT Printability Tester. Example 10 shows the results obtained with a coating color which does not contain a modifier.

TABLE II

| Ex. No. | Amount of PVA [a] (Parts/100 Parts of Clay) | Modifier Type | Amount (Parts/100 Parts of Clay) | Percent Solids | Pattern |
|---|---|---|---|---|---|
| 6 | 3.0 | HEC [b] | 0.5 | 52 | Very slight. |
| 7 | 3.0 | MC [c] | 0.5 | 52 | Do. |
| 8 | 3.0 | SAP [d] | 1.0 | 50 | Do. |
| 9 | 3.0 | SA [e] | 0.5 | 52 | Do. |
| 10 | 3.0 | None | | 55 | Heavy ridges. |

[a] Specified viscosity of 55–65 cp., 99–100% hydrolysis and pH of 6–8.
[b] Hydroxyethylcellulose, having a viscosity of 1,500–2,000 cp. in a 1% solution determined by the Hoeppler falling ball method.
[c] Methylcellulose, having a viscosity of 3,000–5,600 cp. in a 2% solution at 20° C. determined by the method of ASTM D1347-56.
[d] Sodium acrylate polymer having a viscosity of 12,000–21,000 cp. in a 20% solution using a No. 4 spindle at 12 r.p.m.
[e] Sodium alginate having a viscosity of about 50 cp. in a 1% solution using a No. 3 spindle at 60 r.p.m.

Examples 11 through 14 shown in Table III illustrate the performance of coating colors of this invention based on pigments other than clay, compared with corresponding coating colors which do not contain a modifier. These coating colors were applied by the IGT Printability Tester.

TABLE III

| Ex. No. | Type of Pigment | Amount of PVA [a] (Parts/100 Parts of Pigment) | Amount of CMC [b] (Parts/100 Parts of Pigment) | Percent Solids | Pattern |
|---|---|---|---|---|---|
| 11 | TiO$_2$ | 2.6 | 0.9 | 50 | Very slight. |
| 12 | TiO$_2$ | 3.5 | None | 50 | Severe. |
| 13 | CaCO$_3$ | 2.6 | 0.9 | 50 | Very slight. |
| 14 | CaCO$_3$ | 3.5 | None | 50 | Severe. |

[a] Specified viscosity of 55–65 cp., 99–100% hydrolysis and pH of 6–8.
[b] Specified degree of substitution of 0.65–0.85 and viscosity of 1,300–2,200 cp. in a 1% solution using a No. 3 spindle at 30 r.p.m.

weight of modifier per 100 parts of clay is required. If less than about 0.1 part of modifier is used per 100 parts of clay the composition does not possess tack and will not form a bond. Compositions containing more than 4 parts of modifier per 100 parts of clay are too viscous in water solution to be formulated at the required solids content. It is generally preferred to use about 0.2–3 parts per 100 parts of clay. Sodium carboxymethylcellulose is the preferred modifier for these adhesives, but hydroxyethylcellulose, methylcellulose, sodium polyacrylate, or sodium alginate may also be used. The grade of modifier used must be water-soluble.

While any of the papercoating pigments may be used in the compositions intended for use as adhesives, because of economic considerations, clay is the most practical material available.

These adhesive compositions may be prepared by any convenient method. It is preferred to prepare these adhesives by the procedure outlined above for the preparation of coating colors.

When these adhesives are used in laminating operations such as making fiberboard, they should be formulated in a 35–50% solids content water solution to prevent curling or warping of the laminated article upon drying. While these adhesives are particularly advantageous for use in making laminated articles, they may be used for other adhesive applications. Where warping or curling of the substrate is not a problem, the liquid adhesive may be formulated at any solids content desired.

The following example illustrates a preferred way in which the compositions of this invention may be used as adhesives. In Example 15 (and also Example 16 which follows) the materials used were: (1) kaolin clay, (2) a commercial grade of polyvinyl alcohol ("PVA") having a specified viscosity of 55–65 cp. in a 4% water solution at 20° C. determined by the Hoeppler falling ball method, 99–100% hydrolysis and a pH of 6–8, and (3) a commercial grade of sodium carboxymethylcellulose having a specified degree of substitution of 0.65–0.85 and a viscosity of 300–600 cp. in a 2% solution at 25° C. determined by a Brookfield viscosimeter using a No. 2 spindle at 30 r.p.m.

EXAMPLE 15

An adhesive composition was formulated by the method indicated above which contained:

| | |
|---|---|
| Clay _____ parts by weight__ | 100 |
| CMC _____ parts__ | 1.6 |
| PVA _____ do___ | 8 |
| Tetrasodium pyrophosphate _____ do___ | 0.35 |
| Water _____ do___ | 140 |

This adhesive was formulated in a 44% solids content water solution, and was used to laminate paper to form a solid fiberboard on a commercial pasting machine. The laminated fiberboard did not curl or warp when the adhesive dried. The adhesive strength of this composition was evaluated and the following results were noted (1) there was complete fiber tear (i.e. no adhesive failure) when the fiberboard was delaminated by pulling apart the substrates, (2) there was no ply separation when the fiberboard was soaked for over 24 hours in water, and (3) there was complete fiber tear when delaminated after the soaked fiberboard was dried.

The following example illustrates the necessity of incorporation of one of the aforementioned modifiers into these adhesives.

EXAMPLE 16

A composition was prepared by the same manner used in Example 15, which contained:

| | |
|---|---|
| Clay _____ parts by weight__ | 100 |
| PVA _____ parts__ | 8 |
| Tetrasodium pyrophosphate _____ do___ | 0.35 |
| Water _____ do___ | 139 |

This composition which did not contain a modifier was formulated in a 44% solids content water solution. It was attempted to use this composition to form a fiberboard by the method used in Example 15, however, this composition lacked tack and an adhesive bond could not be formed.

EXAMPLE 17

Example 15 was repeated using four different adhesive compositions wherein hydroxyethylcellulose, methylcellulose, sodium polyacrylate and sodium alginate, respectively, were substituted for the sodium carboxymethylcellulose used in the adhesive of Example 15, the component proportions being the same as shown therein. Similar results to those discussed in Example 15 where obtained.

Specific embodiments of this invention have been set forth in considerable detail. However, many variations not departing from the spirit and scope of this invention will be apparent to those skilled in the art.

What is claimed is:

1. The composition having a solids content of at least 35% by weight and comprising 100 parts by weight of pigment and a pigment binder consisting of the combination of 1–15 parts by weight of water-soluble polyvinyl alcohol and 0.1–4 parts by weight of a water-soluble modifier selected from the group consisting of sodium carboxymethylcellulose, hydroxyethylcellulose, methylcellulose, and sodium polyacrylate, said polyvinyl alcohol and said modifier being dissolved in water in said composition.

2. The composition of claim 1 wherein the said pigment is a member of the group consisting of clay, titanium dioxide and calcium carbonate.

3. The composition of claim 2 wherein the said water-soluble modifier is sodium carboxymethylcellulose.

4. The composition of claim 3 wherein the said pigment is clay.

5. A paper coating composition having a solids content of at least 35% by weight and comprising 100 parts by weight of pigment and a pigment binder consisting of the combination of 2–8 parts by weight of water-soluble polyvinyl alcohol and 0.2–3 parts by weight of a water-soluble modifier selected from the group consisting of sodium carboxymethylcellulose, hydroxyethylcellulose, methylcellulose, and sodium polyacrylate, said polyvinyl alcohol and said modifier being dissolved in water in said composition.

6. The composition of claim 5 wherein the said pigment is a member of the group consisting of clay, titanium dioxide, and calcium carbonate.

7. The composition of claim 6 wherein the said water-soluble modifier is sodium carboxymethylcellulose.

8. The composition of claim 7 wherein the said pigment is clay.

9. An article comprising a paper substrate having a coating thereon which comprises 100 parts by weight of pigment and a pigment binder consisting of the combination of 2–8 parts by weight of water-soluble polyvinyl alcohol and 0.2–3 parts by weight of a water-soluble modifier selected from the group consisting of sodium carboxymethylcellulose, hydroxyethylcellulose, methylcellulose, and sodium polyacrylate.

10. The article of claim 9 wherein the said pigment is a member of the group consisting of clay, titanium dioxide, and calcium carbonate.

11. The article of claim 10 wherein the said water-soluble modifier is sodium carboxymethylcellulose.

12. The article of claim 11 wherein the said pigment is clay.

13. An adhesive composition having a solids content of at least 35% by weight and comprising 100 parts by weight of clay and a clay binder consisting of the combination of 5–12 parts by weight of water-soluble polyvinyl alcohol and 0.2–3 parts by weight of a water-soluble modifier selected from the group consisting of sodium carboxymethylcellulose, hydroxyethylcellulose, methylcellulose, and sodium polyacrylate, said polyvinyl alcohol and said modifier being dissolved in water in said composition.

14. The composition of claim 13 wherein the said water-soluble modifier is sodium carboxymethylcellulose.

References Cited

UNITED STATES PATENTS

| | | | |
|---|---|---|---|
| 2,251,296 | 8/1941 | Shipp. | |
| 2,364,738 | 12/1944 | Marberg et al. | |
| 2,875,166 | 2/1959 | Hopkins. | |
| 3,057,811 | 10/1962 | Trachtenburg | 260—29.6 |
| 3,081,198 | 3/1963 | Miller | 260—8 |
| 2,250,681 | 7/1941 | Schwartz. | |
| 2,256,853 | 9/1941 | Schwartz. | |
| 2,487,448 | 11/1949 | Kingerley | 156—328 X |
| 2,583,274 | 1/1952 | Niles | 260—29.6 |
| 3,057,811 | 10/1962 | Trachtenburg et al. | 260—17 |
| 3,298,862 | 1/1967 | Fairchild et al. | |

HAROLD D. ANDERSON, Primary Examiner

E. M. WOODBERRY, Assistant Examiner

U.S. Cl. X.R.

117—155, 161; 260—17.4, 29.6